United States Patent
Eichelberger

(10) Patent No.: US 9,586,266 B2
(45) Date of Patent: Mar. 7, 2017

(54) TOOLHOLDER WITH TUNABLE PASSIVE VIBRATION ABSORBER ASSEMBLY

(71) Applicant: Kennametal Inc., Latrobe, PA (US)

(72) Inventor: Samuel Lawrence Eichelberger, Trafford, PA (US)

(73) Assignee: KENNAMETAL INC., Latrobe, PA (US)

( * ) Notice: Subject to any disclaimer, the term of this patent is extended or adjusted under 35 U.S.C. 154(b) by 100 days.

(21) Appl. No.: 14/604,465

(22) Filed: Jan. 23, 2015

(65) Prior Publication Data

US 2016/0214182 A1    Jul. 28, 2016

(51) Int. Cl.
| | | |
|---|---|---|
| *B23B 29/02* | (2006.01) | |
| *F16F 7/01* | (2006.01) | |
| *B23B 27/00* | (2006.01) | |

(52) U.S. Cl.
CPC .......... *B23B 29/022* (2013.01); *B23B 27/002* (2013.01); *B23B 27/007* (2013.01); *F16F 7/015* (2013.01); *B23B 2250/16* (2013.01); *B23B 2260/004* (2013.01); *Y10T 408/76* (2015.01)

(58) Field of Classification Search
CPC ..... B23B 29/022; B23B 27/002; B23C 5/003; B23C 2250/04; B23C 2250/16; Y10T 408/76

See application file for complete search history.

(56) References Cited

U.S. PATENT DOCUMENTS

| | | | | |
|---|---|---|---|---|
| 2,641,940 | A | * | 6/1953 | White ................. B23B 29/022 188/268 |
| 2,699,696 | A | | 1/1955 | Hahn |
| 2,882,763 | A | * | 4/1959 | Fry ..................... B23B 29/022 408/143 |
| 3,064,503 | A | * | 11/1962 | Fry ..................... B23B 29/022 403/19 |

(Continued)

FOREIGN PATENT DOCUMENTS

| | | |
|---|---|---|
| FR | 1016808 A | 11/1952 |
| GB | 1032232 | 6/1966 |

(Continued)

OTHER PUBLICATIONS

"Particle Damping for Passive Vibration Suppression: Numerical Modeling with Experimental Verification," Xu et al., Proceedings of DETC'03, ASME 2003 Design Engineering Technical Conferences and Computers and Information in Engineering Conference, Chicago, Illinois, USA (Sep. 2003).

*Primary Examiner* — Daniel Howell
(74) *Attorney, Agent, or Firm* — Ian K. Samways

(57) ABSTRACT

A toolholder includes a cutting tool mounted to a head attached to a collar at a first end of the toolholder. A shank is located at a second, opposite end of the toolholder. A central cavity extends inwardly from the first end toward the shank. A passive vibration absorber assembly is disposed within the central cavity. The passive vibration absorber assembly includes an absorber body and an absorber cap attached to the absorber body. The absorber body has a first end, a second end opposite the first end, and one or more cavities formed in the second end. The one or more cavities of the absorber body are partially of wholly filled with metal or ceramic particles or powders to provide particle damping for suppressing vibration of the toolholder.

8 Claims, 4 Drawing Sheets

(56) References Cited

U.S. PATENT DOCUMENTS

| | | |
|---|---|---|
| 3,164,041 A | 1/1965 | Carlstedt |
| 3,172,308 A * | 3/1965 | Shurtliff ................ B23B 29/022 |
| | | 408/143 |
| 3,230,833 A | 1/1966 | Shurtliff |
| 3,242,791 A | 3/1966 | Smith |
| 3,447,402 A | 6/1969 | Ray |
| 3,774,730 A | 11/1973 | Maddux |
| 3,838,936 A | 10/1974 | Andreassen et al. |
| 4,061,438 A | 12/1977 | New |
| 4,553,884 A | 11/1985 | Fitzgerald et al. |
| 4,998,851 A | 3/1991 | Hunt |
| 6,443,673 B1 | 9/2002 | Etling et al. |
| 7,131,797 B2 * | 11/2006 | Kai ........................ B23B 31/02 |
| | | 408/143 |
| 7,591,209 B2 * | 9/2009 | Murakami ............ B23B 27/002 |
| | | 408/143 |
| 8,337,125 B2 * | 12/2012 | Digernes ................ B23B 27/10 |
| | | 279/20 |
| 9,016,988 B2 * | 4/2015 | Sakamaki ............... B23B 31/00 |
| | | 408/143 |
| 2011/0255932 A1 * | 10/2011 | Cook ...................... B23C 5/003 |
| | | 409/141 |

FOREIGN PATENT DOCUMENTS

| | | | |
|---|---|---|---|
| JP | 58051002 A | * | 3/1983 |
| JP | 2-185303 A | | 7/1990 |
| JP | 03-86404 A | | 4/1991 |
| JP | 03221301 A | * | 9/1991 |
| JP | 03221302 A | * | 9/1991 |
| JP | 03221303 A | * | 9/1991 |
| JP | 06155131 A | * | 6/1994 |
| JP | 07227711 A | * | 8/1995 |
| JP | 08047802 A | * | 2/1996 |
| SU | 1134300 A | | 1/1985 |
| SU | 1196153 A | | 12/1985 |
| WO | 2004/024389 A1 | | 8/2003 |
| WO | 2014/033020 A1 | | 8/2013 |

* cited by examiner

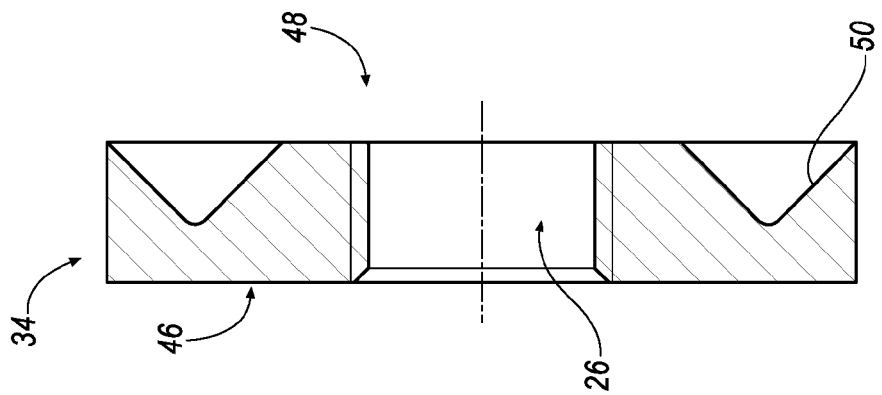
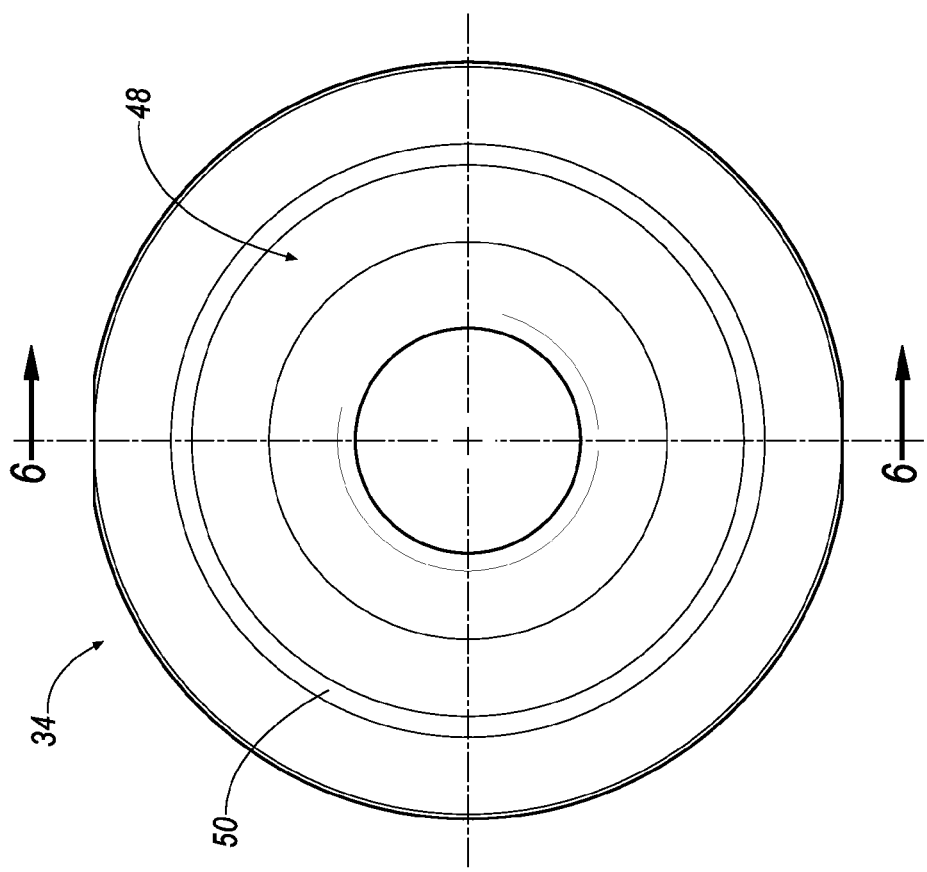

TOOLHOLDER WITH TUNABLE PASSIVE VIBRATION ABSORBER ASSEMBLY

FIELD OF THE INVENTION

In general, the invention relates to a toolholder and, more particularly, to a toolholder, such as a boring bar, with a tunable passive vibration absorber assembly with particle damping for passive vibration suppression.

BACKGROUND OF THE INVENTION

During a metal cutting operation, any vibratory motion between a toolholder and workpiece may lead to undesirable cutting performances such as poor workpiece surface finish and out-of-tolerance finished workpieces. Furthermore, such vibration may cause the toolholder or the machine tool to become damaged.

To reduce these vibrations, the metal removal rate can be decreased. However, this approach interferes with production and only minimally reduces the amount of vibration.

Attempts to eliminate the vibration in a toolholder may also include using a boring bar fabricated from solid carbide. Solid carbide, because of its inherently high density, reduces the amount of chatter and vibration transferred to the boring bar. However, solid carbide is extremely expensive. Furthermore, although chatter and vibration are reduced by the inherently high density of the solid carbide bar, vibration nonetheless may build to an unacceptable level. Still furthermore, solid carbide is fairly brittle and a minor impact upon the boring bar during use or setup may inadvertently damage the bar.

A further attempt to reduce vibration in boring bars includes mounting upon or within the bar a dynamic vibration absorber, such as that absorber disclosed in U.S. Pat. No. 3,774,730, which is comprised of a cylindrical mass of a high density material supported on rubber bushings. When optimally tuned, the mass oscillates in response to vibration produced in the boring bar to cancel out vibration. The absorber may be tuned to accommodate the boring bar for the speed at which the workpiece or boring bar is rotating, the length of the boring bar and the type of cutting tool connected at the end of the bar. Such an adjustment is made by longitudinally urging pressure plates at opposing ends of the cylindrical mass thereby compressing the rubber bushings against the mass which simultaneously shifts the position of the mass and alters the stiffness of the rubber bushings to change the dynamics of the cylindrical mass.

However, even with such a design available, each time the boring bar is to be used under different conditions, it must be tuned using sophisticated equipment that may or may not be available on the shop floor.

SUMMARY OF THE INVENTION

The problem of suppressing vibration in a toolholder is to provide metal or ceramic particles or powders of small size within one or more cavities of a passive vibration absorber assembly with particle damping for passive vibration suppression.

In one aspect of the invention, a toolholder comprises a cutting tool mounted to a head attached to a collar at a first end of the toolholder. A shank is located at a second, opposite end of the toolholder. A central cavity extends inwardly from the first end toward the shank. A passive vibration absorber assembly is disposed within the central cavity. The passive vibration absorber assembly comprises an absorber body and an absorber cap attached to the absorber body. The absorber body has a first end, a second end opposite the first end, and a plurality of cavities formed in the second end. The plurality of cavities of the absorber body are partially of wholly filled with metal or ceramic particles or powders for providing particle damping for vibration suppression of the toolholder.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 5 is an end view of an absorber cap of the passive vibration absorber assembly according to an embodiment of the invention; and FIG. 6 is a cross-sectional view of the absorber cap of the passive vibration absorber assembly taken along line 6-6 of FIG. 5;

DETAILED DESCRIPTION OF THE INVENTION

Figure 1:
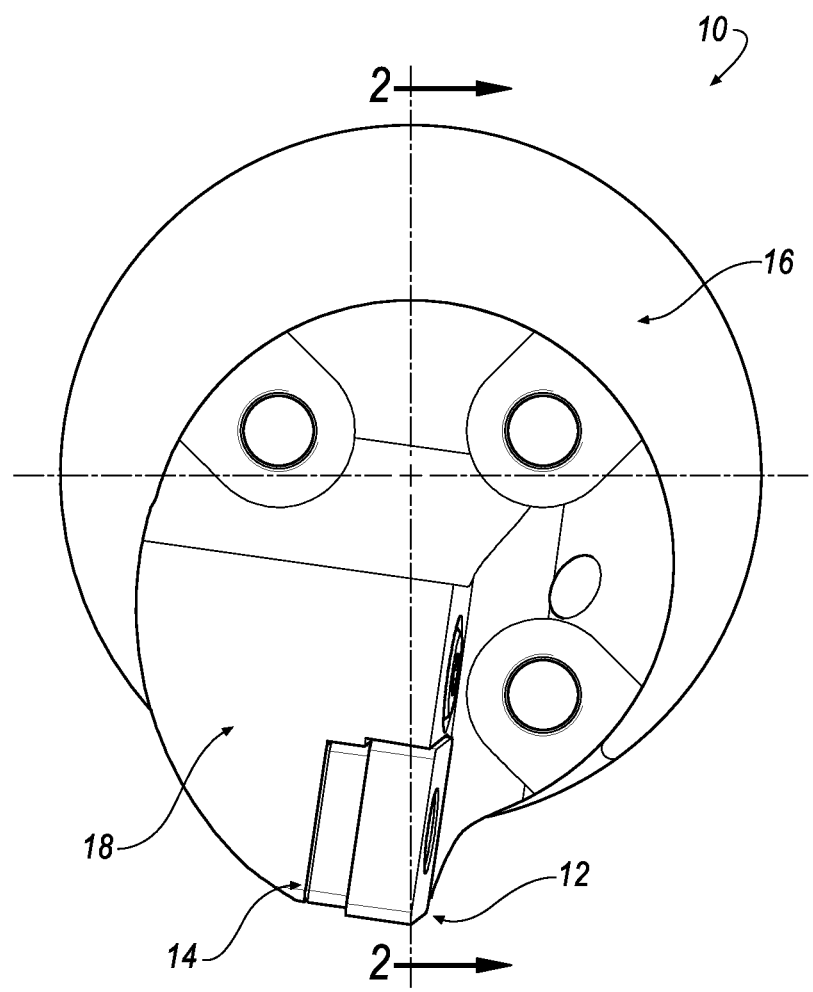
FIG. 1 is an end view of a toolholder with a passive vibration absorber assembly according to an embodiment of the invention.
Figure 2:
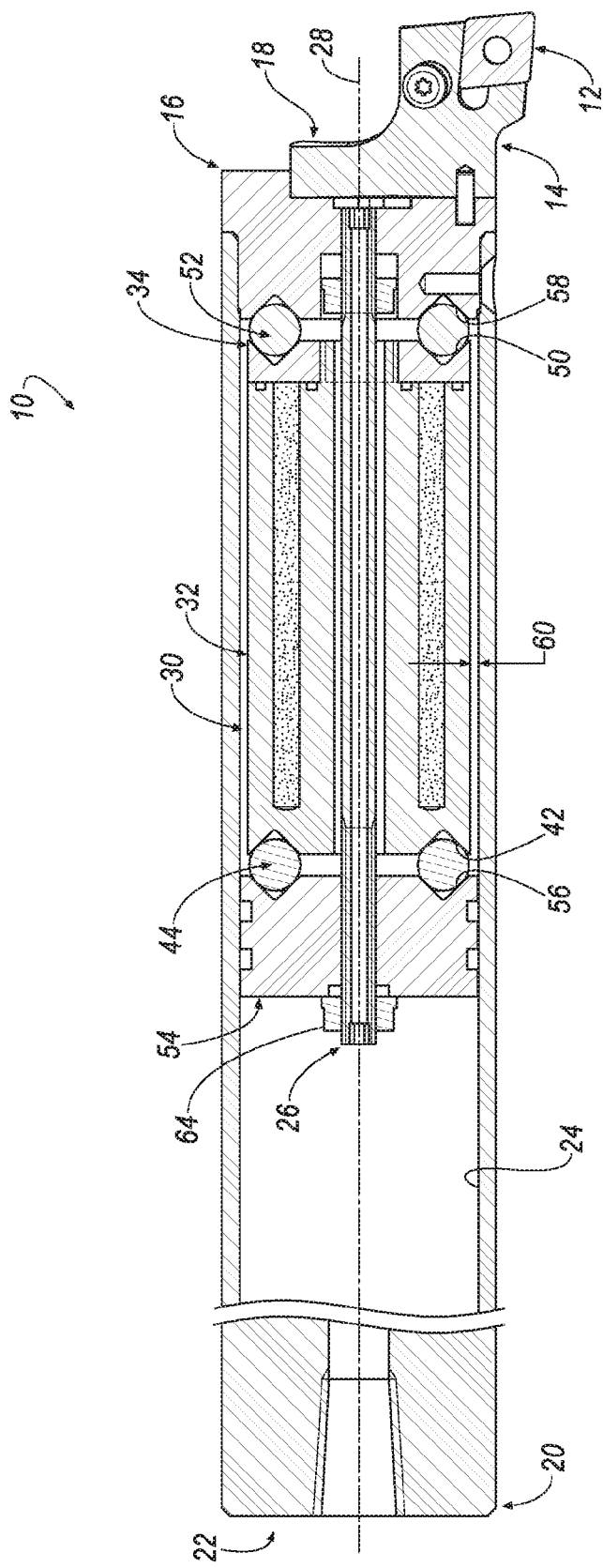
FIG. 2 is a cross-sectional view of the toolholder with the passive vibration absorber assembly taken along line 2-2 of FIG. 1.

Referring now to FIGS. 1 and 2, a toolholder 10, such as a boring bar is shown according to an embodiment of the invention. Although the present invention is directed to a boring bar 10 for boring deep holes in work pieces, the principles of the invention can be applied to any toolholder that produces vibrations when cutting a work piece.

A cutting tool, such as a cutting tool 12, such as a cutting insert, may be mounted in a conventional manner to a head 14 attached to a collar 16 at one end 18 of the boring bar 10. A shank 20 is located at the opposite end 22 of the boring bar 10. The boring bar 10 has a central cavity 24 extending inwardly from the end 18 toward the shank 20. In the illustrated embodiment, the boring bar 10 includes a coolant tube assembly 26 extending along a central, longitudinal axis 28 of the boring bar 10 for providing coolant in the vicinity of the cutting insert 12. It will be appreciated that the coolant tube assembly 26 is optional and can be omitted. For example, the coolant tube can be replaced with a threaded stud or a solid stud with threaded ends.

Use of the boring bar 10 in a metalworking operation will produce vibrations that travel through the boring bar 10, thereby affecting the stability of the cutting process. For this reason, the boring bar 10 is provided with a passive vibration absorber assembly, shown generally at 30, according to an embodiment of the invention that will dampen the vibrations traveling through the boring bar 10. The passive vibration absorber assembly 30 comprises a generally cylindrical absorber body 32 and an absorber cap 34 attached to the absorber body 32. In the illustrated embodiment, the absorber cap 34 is threaded onto the absorber body 32.

However, it will be appreciated that the absorber cap 34 can be attached to the absorber body 32 using any means well-known in the art, such as gluing, brazing, and the like.

Figure 4:
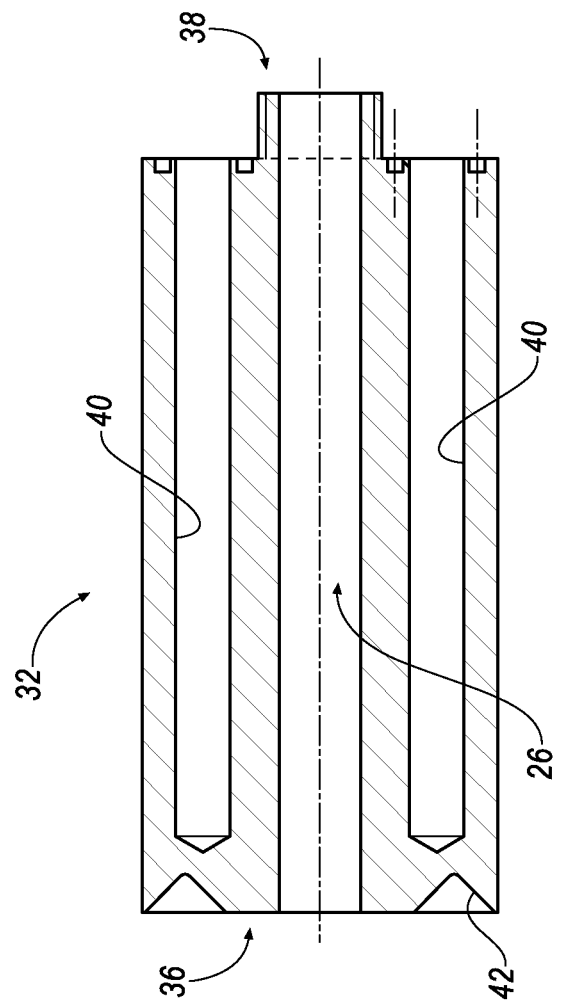
FIG. 4 is a cross-sectional view of the absorber body of the passive vibration absorber assembly taken along line 4-4 of FIG. 3.
Figure 3:
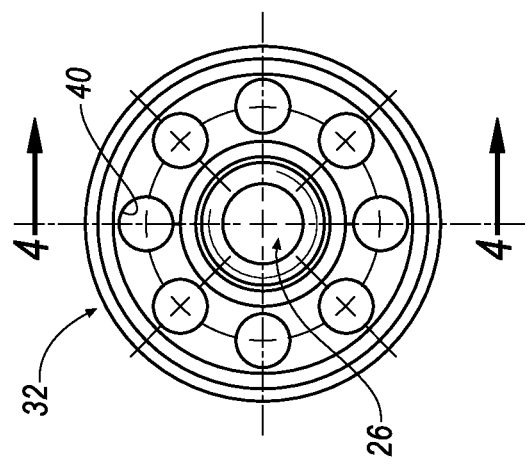
FIG. 3 is an end view of an absorber body of the passive vibration absorber assembly according to an embodiment of the invention.

Referring now to FIGS. 3 and 4, the absorber body 32 has a first end 36, a second end 38 opposite the first end 36, and one or more cylindrical cavities 40 formed in the second end 38. The one or more cavities 40 are in the form of blind holes that do not extend entirely from the second end 38 to the first end 36. For example, in the illustrated embodiment, the absorber body 32 has a length of about 3.45 inches (87.63 mm) and the cavities 40 have a length of about 3.10 inches (78.74 mm).

In the illustrated embodiment, the absorber body 32 has a total of eight (8) cavities 40 that are equally and circumferentially spaced about the second end 38. However, it will be appreciated that the invention is not limited by the number of cavities 40, and that the invention can be practiced with any desirable number of cavities 40. For example, the invention can be practiced with a single cavity 40 that forms an annular-shaped cavity. The first end 36 includes a circumferential V-shaped notch 42 for supporting a first elastomeric support 44, such as an O-ring, and the like (FIG. 2).

In one aspect of the invention, the plurality of cavities 40 of the absorber body 32 are partially of wholly filled with metal or ceramic particles or powders 62 (FIG. 2) of small size to form an absorber mass for passive vibration suppression of the toolholder 10. In general, the particles or powders 62 have a diameter less than ⅕ of a diameter of each cavity 40. For example, each cavity 40 may have a diameter of about 0.25 inches (6.35 mm) and the particles 62 can have a diameter in the range of between about 0.05 mm to about 5.00 mm in diameter. Within this size range, the particles 62 are considered non-cohesive and are considered to be spherical and uniform in diameter. In another example, ceramic powders 62 can have a diameter in a range between about 0.5 microns to about 50 microns.

In one embodiment, the volume of a particle or powder 62 has a range between about 0.000524 mm³ for a particle or powder 62 having a diameter of about 0.05 mm to about 65.45 mm³ for a particle or powder 62 having a diameter of about 5.00 mm. In the illustrated embodiment, each cavity 40 has a length of about 78.74 mm and a diameter of about 6.35 mm, and therefore has a volume of about 2495 mm³. Thus, each cavity 40 contains a very large number of particles or powders 62. For example, each cavity 40 may contain a thousand or more particles or powders 62 having a diameter of about 5.00 mm. In another example, each cavity 40 may contain a million or more particles or powders 62 having a diameter of about 0.05 mm.

In one embodiment, metal particles of high density, such as lead, tungsten carbide cobalt, and the like, are disposed within each cavity 40 of the passive vibration absorber assembly 30. In contrast to viscoelastic materials, which dissipate the stored elastic energy, particle damping focuses on energy dissipation in a combination of collision, friction and shear damping. Particle damping involves the potential of energy absorption and dissipation through momentum exchange between moving particles and vibration walls, friction, impact restitution, and shear deformations. Particle damping is an attractive alternative to other forms of passive damping due to its conceptual simplicity, potential effectiveness over broad frequency range, temperature and degradation insensitivity, and very low cost.

Particle damping is a derivative of single-mass impact damper that has been thoroughly studied over the years. In the single-mass case, direct analyses exist and reveal design criteria for optimal efficiency based on reduction in system response. It has been observed through experiments that a plastic "bean bag" filled with lead shot exhibited much greater damping effectiveness and "softer" impacts than a single lead slug of equal mass. Additional benefits of using granular materials instead of a single mass include the elimination of excessive noise and potential damage to the interior wall of the cavity.

Referring now to FIGS. 5 and 6, the absorber cap 34 has a first end 46 and a second end 48 opposite the first end 46. The first end 46 is attached to the second end 38 of the absorber body 32 using means well-known in the art, such as gluing, brazing, and the like. Similar to the first end 36 of the absorber body 32, the second end 48 of the absorber cap 34 has a circumferential V-shaped notch 50 for accommodating a second elastomeric support 52 (FIG. 2), such as an O-ring, and the like.

Referring back to FIG. 2, the passive vibration absorber assembly 30 is tunable by means of an adjusting wedge 54 positioned proximate the first end 36 of the absorber 32. Similar to the absorber body 32 and the absorber cap 34, the adjusting wedge 54 has a circumferential V-shaped notch 56 for accommodating the first elastomeric support 44. Similarly, the collar 16 has a circumferential V-shaped notch 58 for accommodating the second elastomeric support 52 proximate the second end 48 of the absorber cap 34. As a result, the first and second elastomeric supports 44, 52 cause the passive vibration absorber assembly 30 to be suspended within the central cavity 24 of the toolholder 10 by a small distance 60 when the passive vibration absorber assembly 30 is mounted within the central cavity 24 of the toolholder 10.

The adjusting wedge 54 is movable within the central cavity 24 in an axial direction along the central, longitudinal axis 28 of the toolholder 10, thereby selectively adjusting an amount of pressure exerted against the first and second elastomeric supports 44, 52 to tune the passive vibration absorber assembly 30 to a desired frequency. The adjusting wedge 54 is threaded onto coolant tube assembly 26. To tune the subject boring bar 10 it has, in the past, been necessary to monitor the vibration of the boring bar 10 and tighten or loosen the adjusting wedge 54, thereby adjusting the pressure of the elastomer supports 44, 52 against the passive vibration absorber assembly 30. However, this approach becomes cumbersome, and in the boring bar 10 of the invention, it is possible to predefine the amount of compression necessary on the elastomer supports 44, 52 against the passive vibration absorber assembly 30 to minimize vibration (i.e. maximize vibration suppression) under different tool conditions. In this manner, a machine operator may simply adjust the compression of the elastomer supports 44, 52 to predetermine levels for tuning by selectively adjusting the amount of pressure exerted by the adjusting wedge 54 against the elastomeric supports 44, 52, and then threading a jam nut 64 to prevent axial movement of the adjusting wedge 54 along the central, longitudinal axis 28.

As described above, the toolholder 10, such as a boring bar, includes a passive vibration absorber assembly 30 using particle damping for vibration suppression. The passive vibration absorber assembly 30 is tunable by selectively positioning the adjusting wedge 54 along the central, longitudinal axis 28 of the toolholder 10 such that a desired force is exerted against the elastomeric supports 44, 52. The method of particle damping for suppression of vibrations generated by the toolholder provides for superior damping capability as compared to conventional damping methods using a solid absorber mass.

The patents and publications referred to herein are hereby incorporated by reference.

Having described presently preferred embodiments the invention may be otherwise embodied within the scope of the appended claims.

What is claimed is:

1. A toolholder, comprising:
a cutting tool mounted to a head attached to a collar at a first end of the toolholder;
a shank located at a second, opposite end of the toolholder;
a central cavity extending inwardly from the first end toward the shank; and
a passive vibration absorber assembly disposed within the central cavity, the passive vibration absorber assembly comprising an absorber body and an absorber cap attached to the absorber body, the absorber body having a first end, a second end opposite the first end, and a plurality of cavities formed in the second end,
wherein the plurality of cavities of the absorber body are:
partially or wholly filled with metal or ceramic particles or powders to provide particle damping for suppressing vibration of the toolholder; and
equally and circumferentially spaced about the second end.

2. The toolholder of claim 1, wherein the plurality of cavities are in the form of blind holes.

3. The toolholder of claim 1, wherein the particles or powders have a diameter less than $\frac{1}{5}$ of a diameter of each cavity.

4. The toolholder of claim 1, wherein the absorber cap has a first end, and a second end opposite the first end, wherein the first end is attached to the second end of the absorber body.

5. The toolholder of claim 4, wherein the first end of the absorber body has a circumferential V-shaped notch for accommodating a first elastomeric support, and wherein the second end of the absorber cap has a circumferential V-shaped notch for accommodating a second elastomeric support.

6. The toolholder of claim 5, further comprising an adjusting wedge movable within the central cavity in an axial direction along a central, longitudinal axis of the toolholder to selectively adjust an amount of pressure exerted against the first and second elastomeric supports to tune the passive vibration absorber assembly to a desired frequency.

7. The toolholder of claim 6, further comprising a jam nut to prevent axial movement of the adjusting wedge along the central, longitudinal axis.

8. The toolholder of claim 1, wherein the toolholder comprises a boring bar.

* * * * *